United States Patent
Otten et al.

(10) Patent No.: US 11,092,421 B2
(45) Date of Patent: Aug. 17, 2021

(54) AUTOMATED DYNAMIC DIMENSIONAL MEASUREMENT SYSTEMS AND METHODS

(71) Applicant: GAGEMAKER, LP, Pasadena, TX (US)

(72) Inventors: Eric Otten, Cypress, TX (US); Howard Thomas, Houston, TX (US)

(73) Assignee: Gagemaker, L.P., Pasadena, TX (US)

( * ) Notice: Subject to any disclaimer, the term of this patent is extended or adjusted under 35 U.S.C. 154(b) by 202 days.

(21) Appl. No.: 16/155,864

(22) Filed: Oct. 9, 2018

(65) Prior Publication Data

US 2019/0145749 A1 May 16, 2019

Related U.S. Application Data

(60) Provisional application No. 62/570,049, filed on Oct. 9, 2017.

(51) Int. Cl.
| | | |
|---|---|---|
| *G01B 5/08* | (2006.01) | |
| *G01B 3/22* | (2006.01) | |
| *G01B 5/20* | (2006.01) | |

(52) U.S. Cl.
CPC ............... *G01B 5/08* (2013.01); *G01B 3/22* (2013.01); *G01B 5/204* (2013.01)

(58) Field of Classification Search
CPC ............ G01B 3/22; G01B 5/08; G01B 5/204
USPC .......................................................... 33/773
See application file for complete search history.

(56) References Cited

U.S. PATENT DOCUMENTS

| | | | | |
|---|---|---|---|---|
| 4,524,524 A | | 6/1985 | Frank et al. | |
| 4,700,484 A | | 10/1987 | Frank et al. | |
| 4,778,313 A | * | 10/1988 | Lehmkuhl | B23B 29/03457 29/56.5 |
| 5,115,569 A | * | 5/1992 | Kubo | G01B 5/004 33/1 M |
| 5,182,862 A | | 2/1993 | Frank et al. | |
| 6,879,653 B2 | * | 4/2005 | Arias | G21C 17/06 376/252 |
| 7,765,712 B2 | * | 8/2010 | Stockman | G06F 3/023 33/784 |
| 8,839,669 B2 | | 9/2014 | Seibold et al. | |
| 8,978,263 B2 | * | 3/2015 | Nahum | G01B 3/28 33/784 |
| 9,752,427 B2 | | 9/2017 | Douglas et al. | |
| 9,982,985 B2 | * | 5/2018 | Fujikawa | B23Q 35/04 |
| 2002/0088135 A1 | * | 7/2002 | Arlinsky | G01B 3/1084 33/760 |
| 2005/0166413 A1 | * | 8/2005 | Crampton | B25J 13/088 33/503 |
| 2006/0162178 A1 | * | 7/2006 | Freidin | H04Q 9/00 33/784 |
| 2008/0052936 A1 | * | 3/2008 | Briggs | G01B 5/012 33/502 |
| 2008/0202233 A1 | * | 8/2008 | Lan | A61B 5/22 73/379.02 |

(Continued)

*Primary Examiner* — Yaritza Guadalupe-McCall
(74) *Attorney, Agent, or Firm* — McAughan Deaver PLLC

(57) ABSTRACT

A method system of reducing operator-induced error in measurements comprises a measurement tool, such as a diameter gage, that is configured to communicate electrical signals representative of measurements to a computing device, which is configured to receive the signals and to determine a value for the measurement without the operator having to interact with the tool to zero the gage, acquire the data or transmit the data.

22 Claims, 9 Drawing Sheets

(56) References Cited

U.S. PATENT DOCUMENTS

| | | | |
|---|---|---|---|
| 2009/0179162 A1* | 7/2009 | Johnson | G01B 11/2433 250/559.42 |
| 2011/0119025 A1* | 5/2011 | Fetter | G01B 5/008 702/152 |
| 2013/0139397 A1* | 6/2013 | Jordil | G05B 19/402 33/503 |
| 2014/0033554 A1* | 2/2014 | Nahum | G01B 3/28 33/784 |
| 2014/0157610 A1* | 6/2014 | Garvey | G05B 19/401 33/503 |
| 2015/0204653 A1* | 7/2015 | Przygodda | G01B 21/045 33/503 |
| 2015/0219431 A1* | 8/2015 | Jordil | G01B 3/18 33/701 |
| 2015/0300798 A1* | 10/2015 | Pettersson | G01B 21/04 33/503 |
| 2016/0153767 A1* | 6/2016 | Ihlenfeldt | G01C 3/08 33/503 |
| 2017/0038190 A1 | 2/2017 | Douglas et al. | |
| 2019/0145749 A1* | 5/2019 | Thomas | G01B 5/204 33/773 |
| 2019/0195607 A1* | 6/2019 | Nahum | G01B 3/20 |

\* cited by examiner

AUTOMATED DYNAMIC DIMENSIONAL MEASUREMENT SYSTEMS AND METHODS

CROSS REFERENCE TO RELATED APPLICATIONS

This application is a non-provisional of U.S. Provisional Application No. 62/570,049, filed on Oct. 9, 2017, the entire contents of which are incorporated by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The inventions disclosed and taught herein relate generally to metrological devices and processes; and more specifically relate to automating the acquisition of dimensional measurements.

Description of the Related Art

U.S. Pat. No. 4,700,484, owned by Applicant, discloses, "An apparatus for measuring the diameter of an object" is disclosed. A rotatable wheel of known diameter capable of movement in three axes is contacted with an object capable of rotation. The wheel is attached to a shaft encoder which produces pulses as the wheel rotates. As the object is rotated, start and end reference marks are sensed and the pulses produced by the shaft encoder are counted. A microprocessor calculates the diameter of the object knowing the wheel diameter and counts per revolution and the counts per revolution of the object. The apparatus can be adapted to measure the internal or external diameter of smooth objects or the internal or external pitch diameter of threaded objects. The apparatus can also use a calibrated object to measure the diameter of a wheel of unknown diameter to allow the wheel to be used in later measurements."

U.S. Pat. No. 4,524,524, owned by Applicant, discloses, "A gage and method are disclosed for measuring the inside or outside diameter of a product at a selected distance from the end of the product. The gage has a pair of blocks slidable along a pair of parallel vertical guide rails. Each block has a bearing pad, which can be positioned against the end of the product to be measured. An arm extends horizontally from each block and is slidably mounted in an aperture extending through the block. A contact depends vertically from the end of each arm. One contact is mounted on a vertically reciprocal dial indicator plunger. The contacts are first positioned horizontally and vertically using gage blocks which correspond to the specified diameter and distance from the end of the pipe. The gage is then positioned against the end of the product and the contacts are brought into contact with the surface of the product at diametrically opposed points thereon. The dial indicator displays the deviation of the actual diameter from the specified diameter. This gage and method are particularly adapted to measuring pitch diameters of internally or externally, tapered or straight, threaded products."

U.S. Pat. No. 5,182,862, owned by Applicant, discloses, "An improved indicating thread gage for gaging the functional fit and individual thread parameters of threaded products, especially taper threaded products. Thread form elements engage the threaded product and are capable of longitudinally traversing the threaded product while an indicator transduces radial displacement of the thread form element."

U.S. Pat. No. 9,752,427, owned by Applicant, discloses, "A stator bore gage comprises a detector assembly comprising a wheel configured to engage an inside surface and to transduce the varying surface diameters into electrical or optical signals representative of the condition of the inside surface as the detector traverses the inside surface."

US Patent Application Publication No. 2017-0038190, owned by Applicant, discloses, "A screw thread measurement system and methods may comprise a frame having a reference surface, a carrier coupled to the frame and configured to translate relative to the frame, a dimension measurement system coupled to the carrier and having a thread contact element configured to translate relative to the frame and orthogonally the translation axis of the carrier. The dimension measurement system configured to determine thread dimensions relative to the frame reference surface."

The content of U.S. Pat. Nos. 4,700,484, 4,524,524, 5,182,862, 9,752,427, and US Patent Application Publication 2017-0038190 are hereby incorporated by reference.

BRIEF SUMMARY OF THE INVENTIONS

One of the many possible brief summary of the inventions is a method of measuring comprising providing a metrological instrument configured to transduce one or more dimensional characteristics into one or more electrical signals representative of the one or more characteristics, and configured to communicate information representative of the one or more characteristics; providing a computing device remote from the metrological instrument and configured to receive the information representative of the one or more characteristics; establishing a first period; engaging the instrument with a product to be measured; automatically acquiring without human intervention or activation a plurality of signals representative of a dimensional characteristic of the product during the first period; automatically communicating without human intervention or activation information representative of the characteristic acquired during the first period to the computing device; and determining at least one dimensional characteristic of the product from the information representative of the characteristic for the first period. The instrument and computing device may be configured to communicate wirelessly. The computing device may comprise a smart phone, a tablet computer, or a laptop computer. As between the metrological instrument and the computing device, the computing device may be configured to determine the dimensional characteristic. The dimensional characteristic may be determined by a statistical analysis of the information representative of the characteristic. The information representative of the characteristic may comprise the plurality of signals representative of the dimensional characteristic of the product during the first measurement period. The instrument may be configured to indicate that the first period is elapsing, that the period has expired, or a combination of both. The method may comprise indicating that the first period is elapsing, or that the first period has expired. The method may comprise indicating that a valid dimensional characteristic could not be determined from the information representative of the characteristic.

Another of the many possible brief summary of the inventions is a method of reducing human error in measurements may comprise providing a measuring device configured to automatically transduce a measurement into a plurality of electrical signals during a predetermined period; automatically acquiring without human intervention or activation a plurality of signals representative of a dimensional characteristic of the product during the predetermined period; providing a computing device remote from the measuring device; communicating automatically without human intervention or activation the plurality of electrical signals generated during the predetermined period to the computing device; and determining in the computing device a value representative of the measurement based on the plurality of electrical signals. The device and computing device may be configured to communicate wirelessly. The computing device may comprise a smart phone, a tablet computer, or a laptop computer. The value may be determined by a statistical analysis of the plurality of electrical signals. The device maybe configured to indicate that the predetermined period is elapsing, that the period has expired, or a combination of both. The method may comprise indicating that the predetermined period is elapsing, and/or that the predetermined period has expired. The method may comprise indicating that a value could not be determined from the plurality of electrical signals. The predetermined period may be based on a type of measurement to be made. The method may comprise providing a software application on the computing device configured with a sequence of predetermined windows for a particular type of measurement. The particular type of measurement may be selected from: inside diameter, outside diameter, thread profile, minor diameter, pitch diameter, major diameter, pitch, flank angle, thread length, crest diameter, ovality, thread height, stand-off, thread addendum and run-out.

These brief summaries are not intended to define or limit the contents of this disclosure or the scope of the appended claims, or of any claims that ultimately issue herefrom.

BRIEF DESCRIPTION OF THE SEVERAL VIEWS OF THE DRAWINGS

The following figures form part of the present specification and are included to demonstrate further certain aspects of the present invention. The invention may be understood better by reference to one or more of these figures in combination with the detailed description of specific embodiments presented herein.

Figure 1:
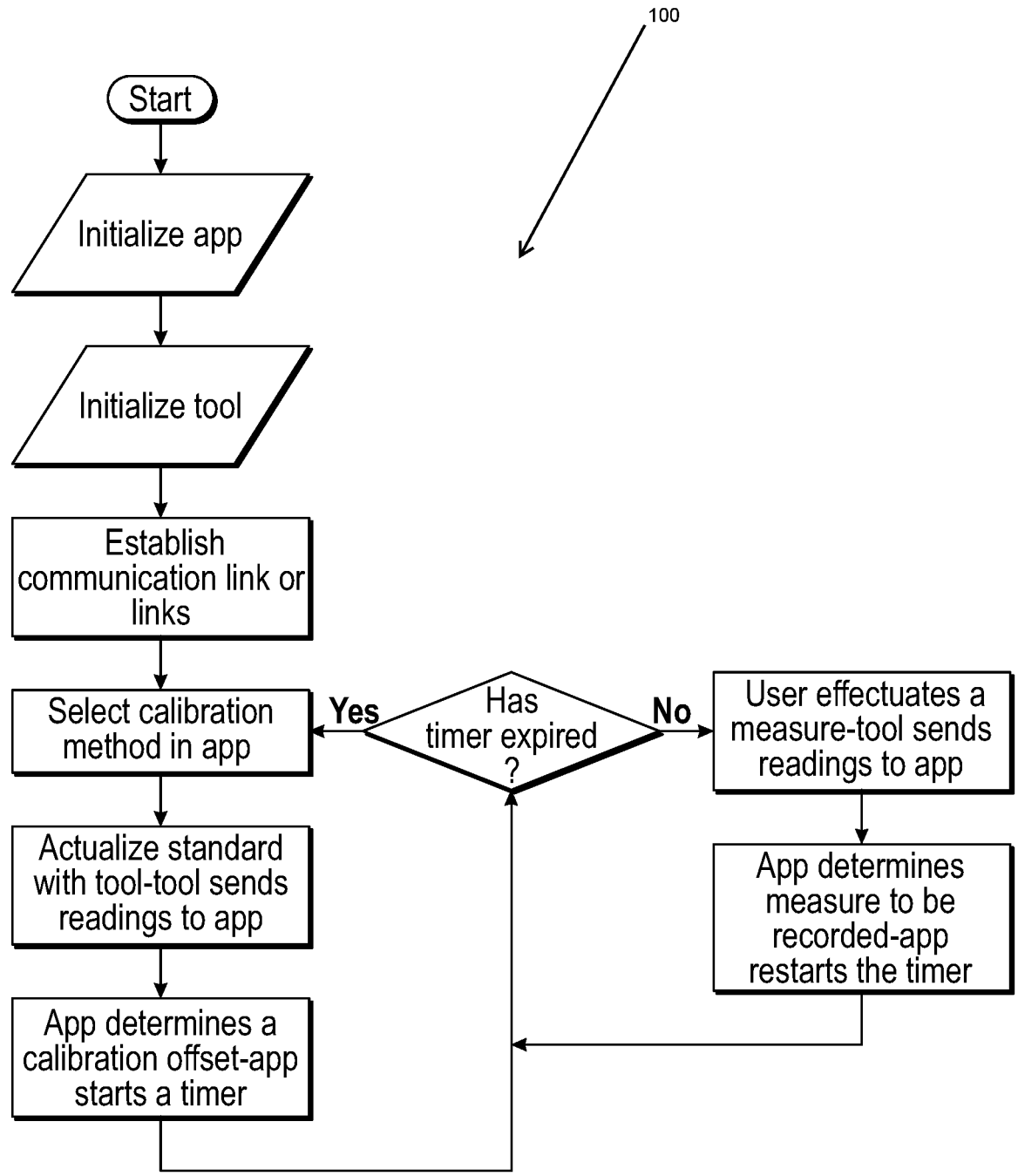
FIG. 1 illustrates a conceptual flowchart providing an overview of one of many possible embodiments of the present inventions.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above and the written description of specific structures and functions below are not presented to limit the scope of what Applicant have invented or the scope of the appended claims. Rather, the Figures and written description are provided to teach any person skilled in the art to make and use the inventions for which patent protection is sought. Those skilled in the art will appreciate that for the sake of clarity and understanding not all features of a commercial embodiment of the inventions are described or shown. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Particular embodiments of the inventions may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

We have invented apparatuses and methods to determine or measure one or moredimensional characteristics of a manufactured item, without inducing, or by minimizing, error-inducing interaction by an operator, such as by automatically acquiring measurement data. For example and without limitation, the apparatus and methods can be used to determine or measure, among other parameters, inside or outside diameter, thread profile parameters, minor diameter, pitch diameter, major diameter, pitch, flank angle, thread length, crest diameter, ovality, thread height, stand-off, thread addendum and run-out.

In a preferred implementation of the inventions disclosed herein, one or more dimensional properties of an item, such as a machined part or thread system, is measured while the part is being manufactured. An embodiment utilizing aspects of the inventions disclosed herein may produce measurements with very good precision, accuracy, and repeatability without error-inducing interactions by the operator for measurement acquisition or transmission, and/or without observing or interacting with dials, meters, or other displays on the tool or in any other part of the system.

It will be appreciated by those familiar with the art that a measurement is made or taken when an operator applies a tool, such as a gage or measurement device, to a work piece, and either visually observes the value of the measurement, and/or physically actuates a data acquisition component (such as depressing a button), both of which interactions may induce movement, and therefore errors in the measurement. In some prior art methods, a measure is recorded when an operator observes the readings on the tool while taking a measure, selects one reading and writes it down or otherwise enters the information. In the apparatuses and methods disclosed herein, a measurement may be made or determined by statistically analyzing all or a selection of readings from a tool while taking a measurement, and then computing the optimal value for the measurement.

It will also be appreciated that determination of the optimal value of the measurement made by a tool utilizing the inventions disclosed herein may be done without human intervention or activation during measurement acquisition or transmission. That is to say, a human operator may actualize the tool by placing it on or near a product and effectuating the tool, but the human operator will not intervene to observe or cause the readings made by the tool. While the operator may need to move the tool through a defined measurement path, such as a measurement sweep, the operator will not need to interact with the tool to activate a reading or measurement acquisition, or measurement transmission. Instead, a tool and system utilizing the inventions disclosed herein may be configured to automatically take or acquire measurement readings during a predetermined measurement window to thereby eliminate operator interaction during measurement acquisition. The acquired data may be automatically communicated to a computing device to determine at least one dimensional property or characteristic from those readings.

To further explain this by contrast, some prior art devices must be triggered by an operator so that a reading may be taken or acquired. Pressing a button or otherwise having an operator physically intervene, such as by zeroing a dial, or otherwise activate the tool, may affect the accuracy and/or precision of the reading. In one situation, the operator may be distracted from observing a gage or meter while intervening with or activating the tool. In another situation, the action of the operator intervening with or activating the tool may alter the position of the tool thereby giving a non-optimal reading.

It will also be appreciated by those of skill in the art that products to be measured may have common properties. As an example, drill string pipes have pin ends and box ends with tapered threads. The taper is a property shared by all drill string pipes. A specific piece of drill string pipe will have the property of tapered threads, but it will also have a specific and measurable characteristic of that property. More specifically, a production run of drill string pipe may specify a thread taper rate of 1.8000°. This may be considered the property of the drill string pipes from that production run. Measuring one specific pipe may find that the thread taper is actually 1.7989° on the pin end and 1.7984° on the box end. These may be considered to be characteristics of that specific piece of pipe.

Embodiments of our systems may comprise two main subsystems: first, a metrological instrument or measurement gage configured to transduce one or more dimensional properties into one or more electrical signals representative of the one or more dimensional properties, and configured to electrically communicate the one or more electrical signals from the metrological instrument; and, second, a computing device remote from the metrological instrument and configured to receive the one or more electrical signals from the metrological instrument. The computing device comprises a software application configured to process data received from the instrument and to determine a value of the measured characteristic. In a preferred embodiment, the instrument continuously acquires measurement data and wirelessly streams that data, and the computing device receives, processes and determines the value of the required measurement or measurements from that data. It will be appreciated that most digital metrological instruments or gages have a data port, which can be used for wired communication with the computing device of the present inventions. Some digital measurement devices are equipped with a wireless transmitter. For those digital gages without an embedded wireless transmitter, the present invention contemplates a wireless communication module configured to interface with an existing data port for wireles sly communicating measurement data as described herein.

The metrological instrument that may be used with the inventions disclosed herein may be any metrological tool, such as but not limited to those depicted in the Gagemaker® product information catalog, including the electronic catalog available over the Internet. Many other tools that take or make measuresurements may also be capable of utilizing the inventions disclosed herein. In one of many possible embodiments, the dimensional measurement component may be one such as described in U.S. Pat. No. 8,839,669, the contents of which are hereby incorporated by reference.

As a general, but not limiting, example to enable aspects of the inventions disclosed herein, many metrological tools have at least one point or surface that may be placed on or near a product. Another point or surface of the tool may react against the surface or a point of the product. This reaction, or deflection, may be displayed in some manner on the tool indicating a measure of a characteristic of the product. A more defined example may be of a tool that measures the outer diameter of a pipe. The tool may have a first surface, such as a contact point or shoe, that is placed on a location on the outer surface of the pipe. Another end of the tool may have a dial gage affixed in such a manner that the contact point of the dial gage will be at maximum extension when it does not touch anything, but at a reduced extension at a point opposite the first surface of the tool when taking a measurement. The value of reduced extension will be representative of the diameter of the pipe at that location. To measure the diameter of the pipe, an operator of the tool will place the first surface of the tool at a predetermined location on the outer surface of the pipe. The operator will then actuate the tool by keeping the first surface of the tool in constant contact with that location on the surface of the pipe, and moving or sweeping, the other end (contact point) of the tool in a manner such that the maximum or minimum deflection of the dial gage may be observed.

If the contact tip of the dial gage were contacting the first surface of the tool when the reading on the dial was exactly 0, then a direct measure could be obtained by observing the dial when the tip was at maximum deflection when measuring the diameter of the pipe. However, the operator usually has to adjust the dial bezel to obtain the zero reading before the measurement sweep is begun. This type of human interaction during the measurement cycle can induce measurement errors.

There are known deficiencies with prior art systems and methods that the inventions disclosed herein address. As noted previously, for analog tools, an operator may become distracted from holding the tool at a point of maximum deflection on the gage when observing or zeroing the dial of the gage. Also, the gage may be positioned in such a way that the operator is not able to easily observe the dial from the proper perspective, which may yield an error. Also, the operator may be making a somewhat subjective reading in trying to observe a gage reading by visually estimating the location of the indicator between gage marks on the dial. In a similar manner, an operator may make a transcription error when recording the observation. For digital tools, the operator may have to press a button to begin data acquisition, to end data acquisition, to zero the tool, and/or to transmit or record data. All of these operator interactions associated with the measurement cycle have a tendency to induce measurement errors.

The metrological instrument of the subject application may have one or more dimensional measurement components, which may comprise one or more transducers configured to measure or determine a physical characteristic of a product, such as, but not limited to, diameter, thickness, or lead. It is preferred that the dimensional measurement components be portable, battery powered, and comprise a radio frequency transmitter or transceiver configured to transmit electrical signals representative of the one or more measurements being made. In a preferred embodiment, the system transmits and receives data via Bluetooth® or other IEEE 802.15 wireless transmission protocol to a data storage and processing system or computing system. In a metrological instrument that has more than one dimensional measurement component, the dimensional measurement components may share a single transceiver. Alternately, the dimensional measurement component may accumulate data from the one or more transducers, manipulate or transform the data, and then transmit the data, or a summary of the data, to the data processing subsystem. The data from the dimensional measurement component can be transmitted to the data processing subsystem by radio frequency, such as Bluetooth communication protocol, other wireless or radio frequency data protocols, or by hard-wired communication protocol.

Regardless of data transmission method, the data processing system may comprise a smart phone, tablet (such as an iPad®), laptop computer, desktop computer, website, or cloud-based system. The data processing subsystem may be configured with processor(s), memory, software, and other circuitry and components to receive data from the measurement instrument, process data for transmission, if necessary, and transmit data. The data processing subsystem may request input from and provide instructions to an operator at the various steps in the processes of making measurements. It is preferred that the data processing subsystem be portable, battery powered and comprise a wireless receiver or transceiver configured to receive an electromagnetic signal from the dimensional measurement component.

It is presently preferred, but not required, that this transmission from the dimensional measurement component to the computing device be one-way. Depending on the particular requirements of each implementation of the inventions, the communication link between the dimensional measurement component and the data processing subsystem can utilize a digital protocol or analog protocol. Applicants have found that the SENT protocol (Single Edge Nibble Transmission) as described in the SAE J2716 standard over Bluetooth transport provides acceptable performance for the inventions described herein.

Turning now to the figures, FIG. 1 illustrates a conceptual flowchart 1000 providing an overview of one of many possible embodiments of the present inventions. The process starts with an operator initializing a software application on the computing device, 1002. This may be as simple as just starting or launching the application, but may also entail that the operator input information such as the identification of the tool that will be used, his own identification such as a username, and any other information that may be useful to the measurement or measurement reporting process. The operator may then initialize the tool to which the computing device will communicate. In a preferred embodiment, the metrological instrument may have an accelerometer or other motion-sensing device, and initialization may be done by merely picking up or shaking the metrological instrument. In alternative embodiments, tool initialization may be done by some interaction with the tool, such as by deflecting a measurement contact, by shaking the tool thereby activating a motion sensor, pressing an on/off button, or by any of a number of other means. In a preferred embodiment, there may be no visual indicators on the tool. In an alternative embodiment, a user may interact with the tool to signal a new action or measurement. As an example, quickly depressing and releasing the measuring rod of the pitch diameter and taper gage may signal a new work piece is to be measured. Similarly, doing that twice may signal something else.

Once the tool is initialized, a communications link to the computing device may be established. The success, failure, and/or status of the link may be displayed on or by the computing device, such as through a visual or auditory indicator, may be displayed on the measurement tool, such as through a visual or auditory indicator, or both.

As FIG. 1 illustrates, the operator may then select a calibration method. In the example of a tool that measures the diameter of a pipe, the calibration method may be performed by inserting and removing a standard into the tool. In one embodiment, the standard may have ends that are squared. In another embodiment, the standard may have rounded ends. When the calibration method has been selected on the computing device, the operator will actualize the tool with the standard. In a preferred embodiment of the measurement tool, once initialized, the tool continuously streams data, and, therefore, automatically sends a plurality of readings or measurements from the dimensional measurement component to the computing device about the standard. The computing device is preferably programmed to recognize, such as through data analysis that a standard is being measured, and a measurement period or window of a predetermined amount of time is activated. The computing device will then process all readings taken during the interaction of the standard with the tool during the measurement window, and will determine a calibration value based on a statistical analysis or other analysis of the data. It is preferred, but not required, that the computing device, the measurement tool, or both, provide the operator visual or auditory or other sensory information concerning the calibration or "zeroing" process. For example, LEDs on the measurement tool, or the screen on the computing device may be configured to show the progress or status of the calibration period.

In one embodiment, once this calibration value has been determined, that is, once the measurement tool has been calibrated, the application on the computing device will start a timer with a predetermined value. The operator must effectuate or complete a measurement within that timer period. If a plurality of data representing the measurement are successfully received by the application, the application will restart the timer and the operator may go on to effectuate other measurements. However, if the timer expires without sufficient or adequate data being received, the application will not process any more measurements until the tool has been recalibrated. In a preferred embodiment, the timer period may be between 7 and 15 seconds, with a preferred embodiment of 10 seconds. This period may allow an operator the time needed to move to a new location and make another measure without the tool falling out of calibration. It is believed that a resolution of 1 mil (0.001 inch) may be realized with acquisition of about 10 measurements per second (at 8 bits), and a resolution of about ½ mil (0.0005 inch) may be realized with acquisition of about 26 measurements per second (at 8 bits). Other resolutions and samplings are also contemplated.

Alternately, the measurement period described above may be proceeded by a null or movement period, such as for example, about 3 to about 10 seconds, during which the operator may move to a product to be measured and/or to position the tool on the product. The application may be configured not to use data received during any such null period for measurement determinations.

It is preferred, but not required, that the computing device, the measurement tool, or both, provide the operator visual or auditory or other sensory information concerning the null periods, the measurement period, or both. For example, LEDs on the measurement tool, or the screen on the computing device may be configured to show the progress, status, or existence of the null period, and/or of the measurement period. It is contemplated that the operator may wear an ear bud that provides auditory indications of progress, status, or existence of the null periods, and/or of the measurement periods.

It will be appreciated that measurement period may need to be different for different tools, products, and/or measurements. In an exemplary embodiment of a tool used for measuring pitch diameter and tapers, a measurement period of about 10 seconds has been found to be acceptable. However, other type of measurements may take shorter or longer periods for an operator to move the tool to a new location on a product or to a new product for another measure to be taken. It is contemplated that the application will have a menu from which a specific type of measurement may be selected, and that the measurement period(s), including null periods, if implemented, will be established.

Figure 2:
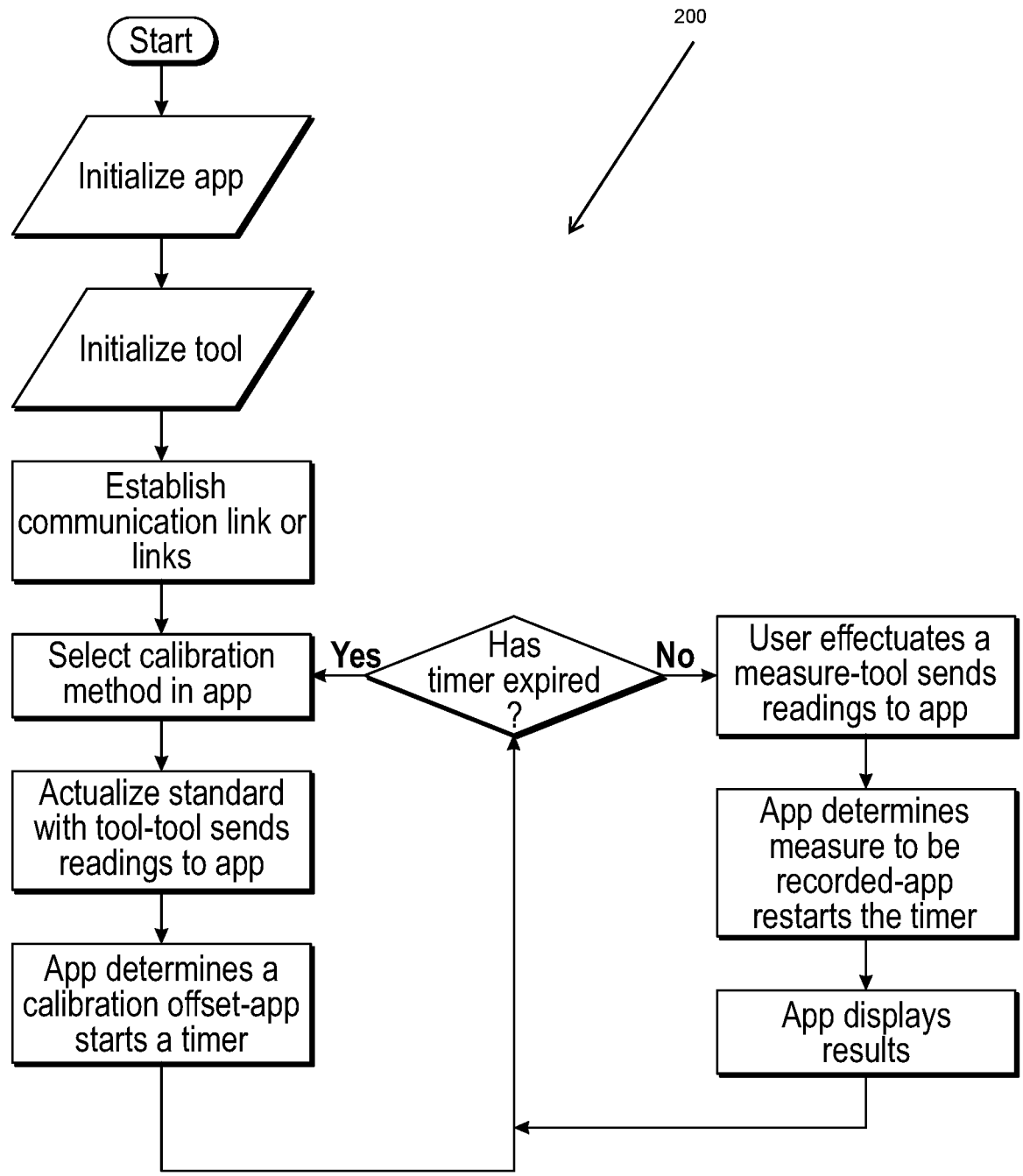
FIG. 2 illustrates a conceptual flowchart providing an overview of one of many possible embodiments of the present inventions.

FIG. 1 shows an embodiment where an operator may make multiple measurements with a tool on a product without interacting, or with minimal interaction during the measurement cycle with either the tool or the computing device. However, FIG. 2 shows an additional step 202 where the application displays the measurement. This may be useful in scenarios where an operator needs to know immediately the results of a measurement cycle, such as, but not limited to, a machine tool, such as a lathe or mill, operator who needs to see the results of the milling operation so that adjustments may be immediately made.

Figure 3:
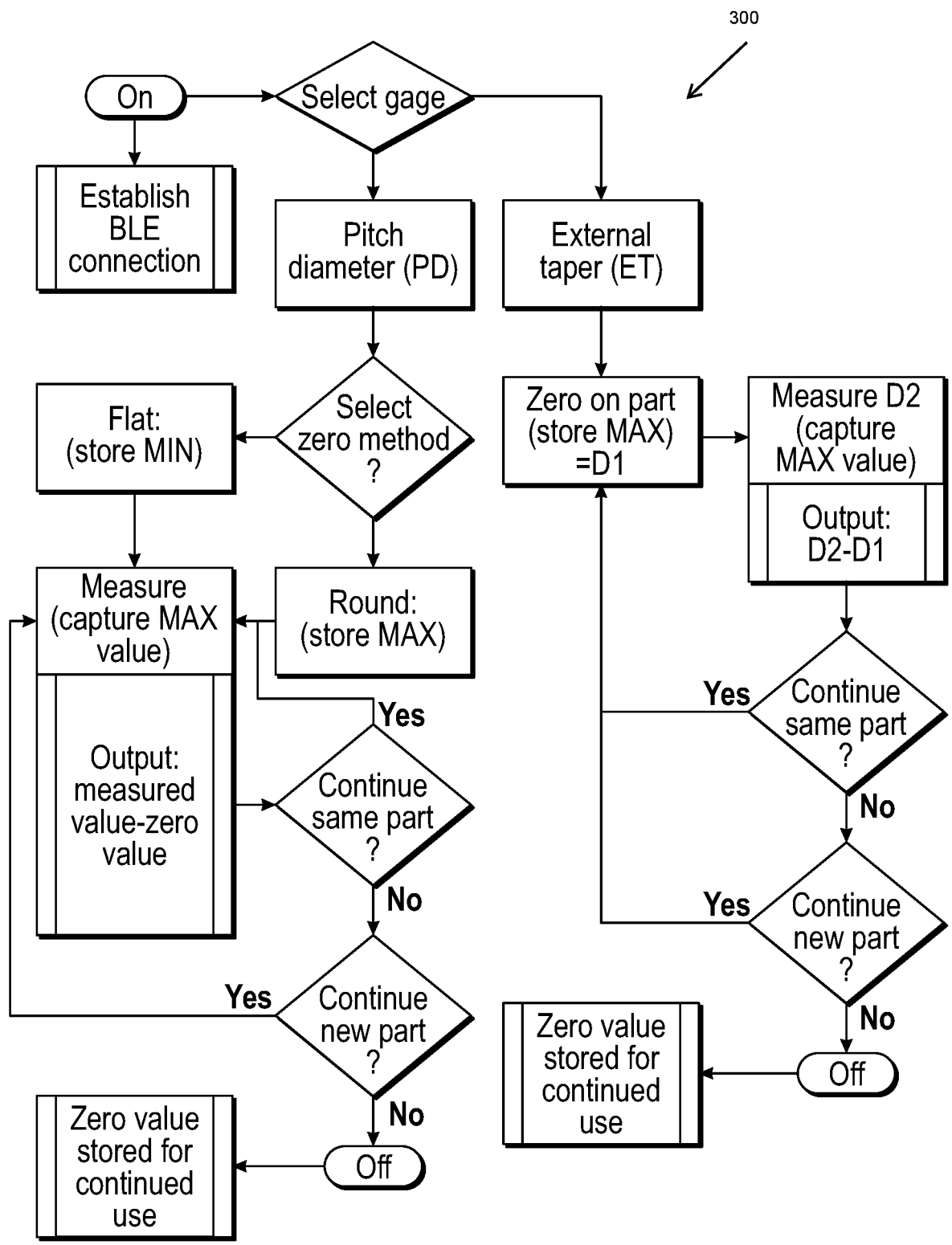
FIGS. 3-6 illustrate flow charts of the inventions disclosed herein that may be suitable for use with some specific metrological tools.
Figure 4:
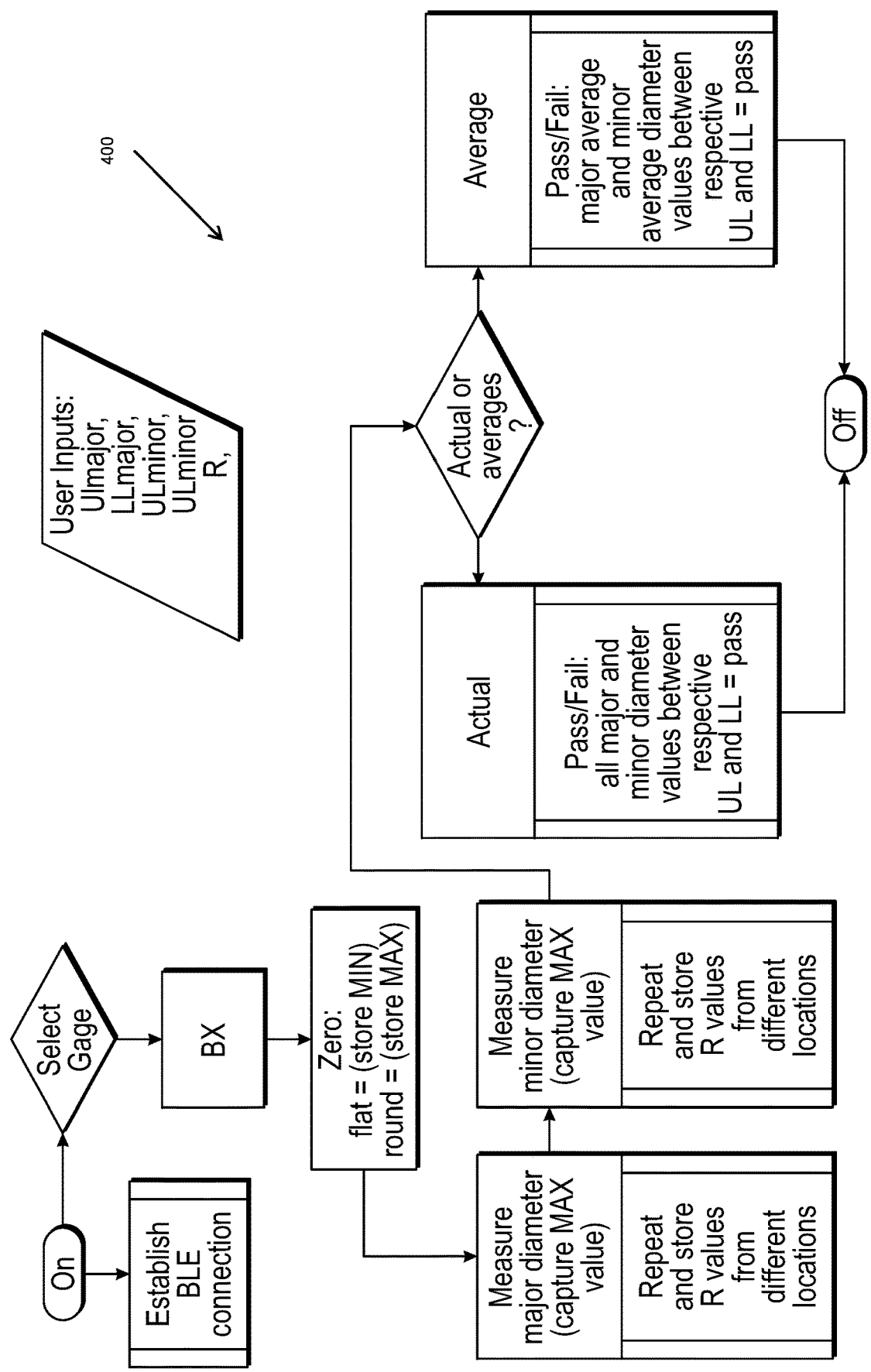
Figure 5:
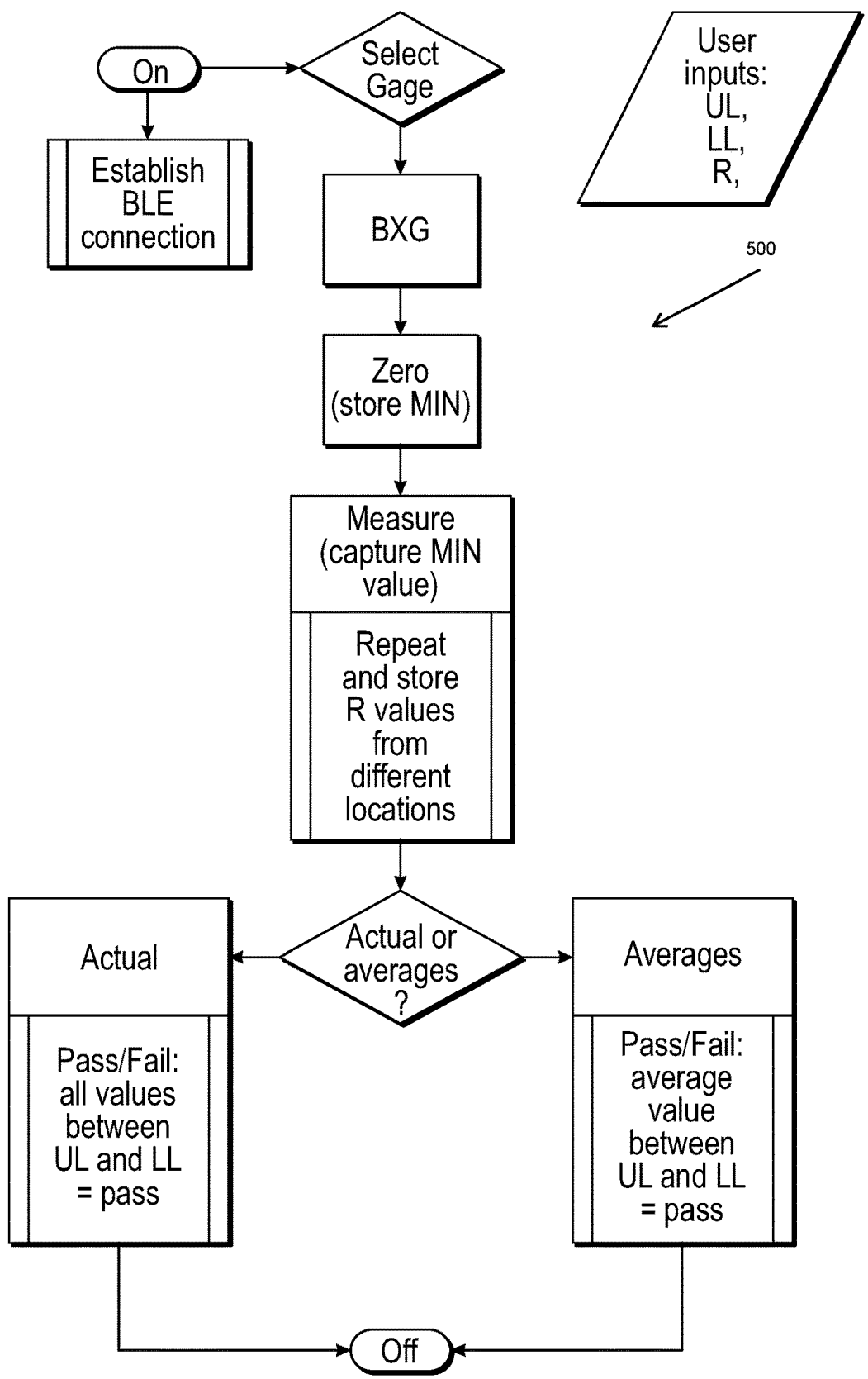
Figure 6:
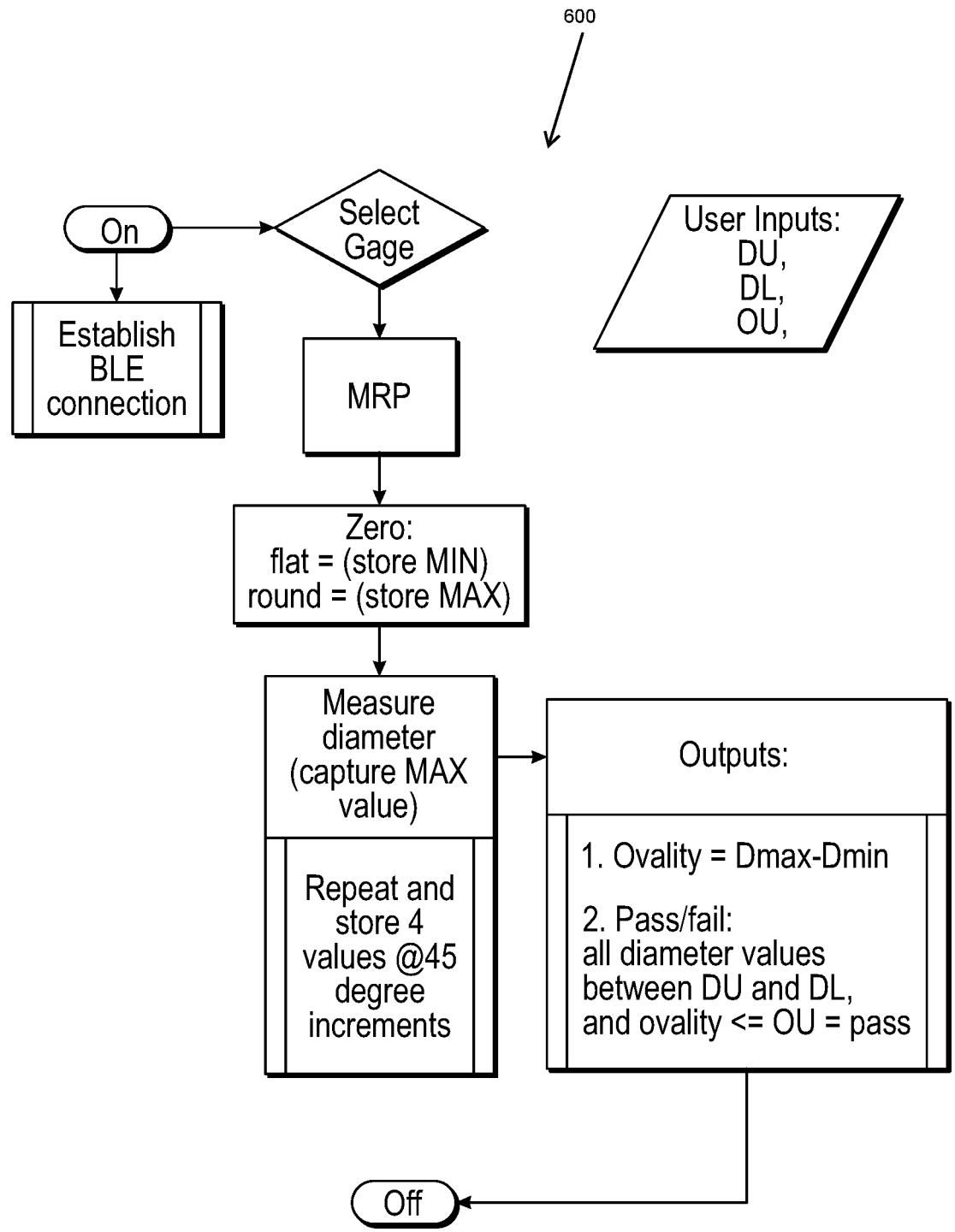

FIGS. 3 through 6 are flow charts utilizing the inventions disclosed herein that may be used for other tools. FIG. 3 may be used with a pitch diameter and taper gage. FIG. 4 may be used with a seal ring groove gage, such as the Gagemaker® BX gage. FIG. 5 may be used with a seal ring groove gage, such as the Gagemaker® BXG gage. FIG. 6 may be used with a crest diameter and ovality gage, such as the Gagemaker® MRP® gage. Each of these different gages represents a different or separate measurement operation, cycle, or sequence. It is contemplated that the application will be configured to implement the required sequence of calibration window(s), measurement window(s), null window(s), and/or other periods to effect the appropriate measurement cycle for that particular tool or type of measurement. It is also contemplated that the operator will know and follow the measurement sequences and timing to produce precise, accurate and repeatable measurement. It is also contemplated that the application can "learn" about each user's habits, and optimize the duration of the various windows. For example, the application may shorten, or may suggest shortening, a measurement window for efficient operators.

Figure 7:
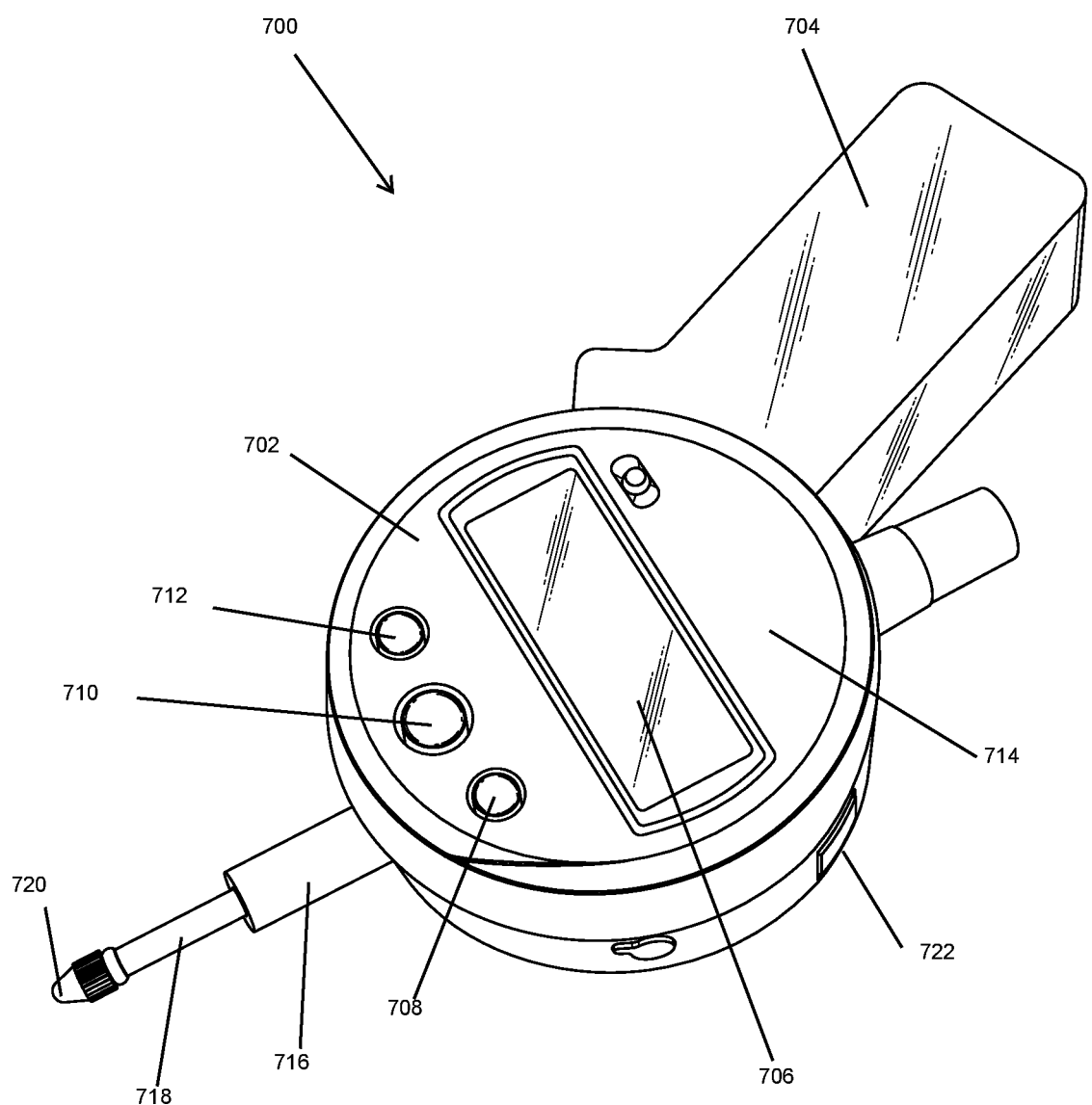
FIGS. 7-9 illustrate an embodiment of a dimensional measurement component suitable for use with the present inventions.

FIG. 7 depicts a dimensional measurement component 700 comprising a transducer 702 and wireless transceiver 704. While this illustrates a dimensional measurement component 702 with a display 706 and features that allow interaction by an operator, (such as zero key 708, on/off key 710, units key 712) a preferred embodiment will not have these features. The transducer is illustrated to comprise a face 714, a stem 716, a spindle 718, and a contact point 720.

Figure 8:
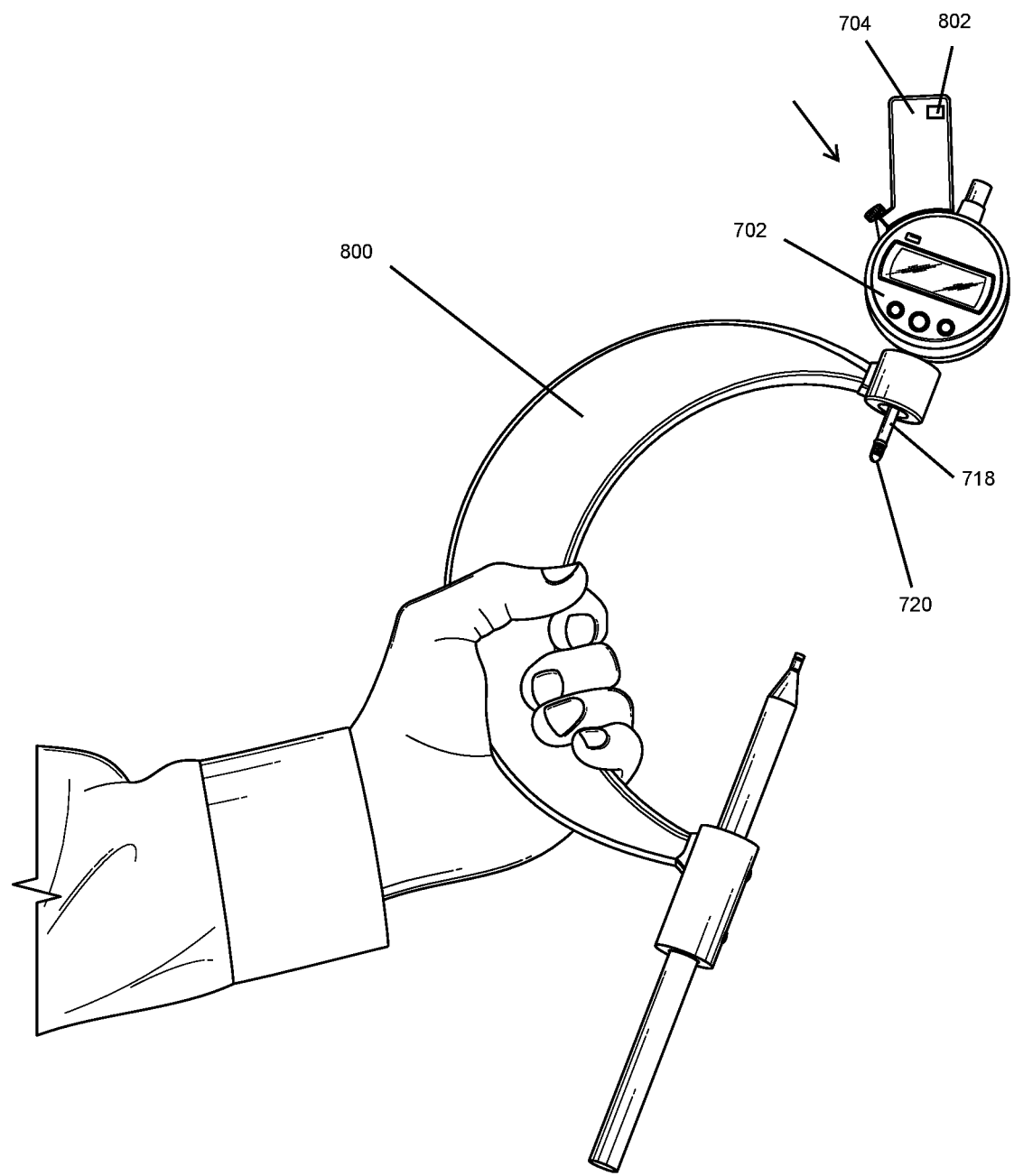

FIG. 8 depicts a metrological tool with the dimensional measurement component 700 illustrated in FIG. 7. In this embodiment, the metrological tool 800 is a pitch diameter and taper gage. As discussed previously, during a measurement cycle, the operator must hold this tool on, e.g., a pin end of a drill pipe, at a predetermined location and sweep the tool through 360° to obtain the data necessary from which a value representing diameter may be obtained. Although the operator must interact with the tool to perform the sweep, with the present inventions, the operator does not have to interact with the tool to start or stop the data measurement or to transmit the data to the computing device. In one proposed embodiment, in which the tool continuously streams data, the operator may place the tool on the pin end and begin a measurement sweep. The application is configured to determine when a measurement cycle or sweep is under way, such as through statistical analysis of the streamed data, and if determined, select measurement data within the measurement period for use in determining a measurement value.

Figure 9:
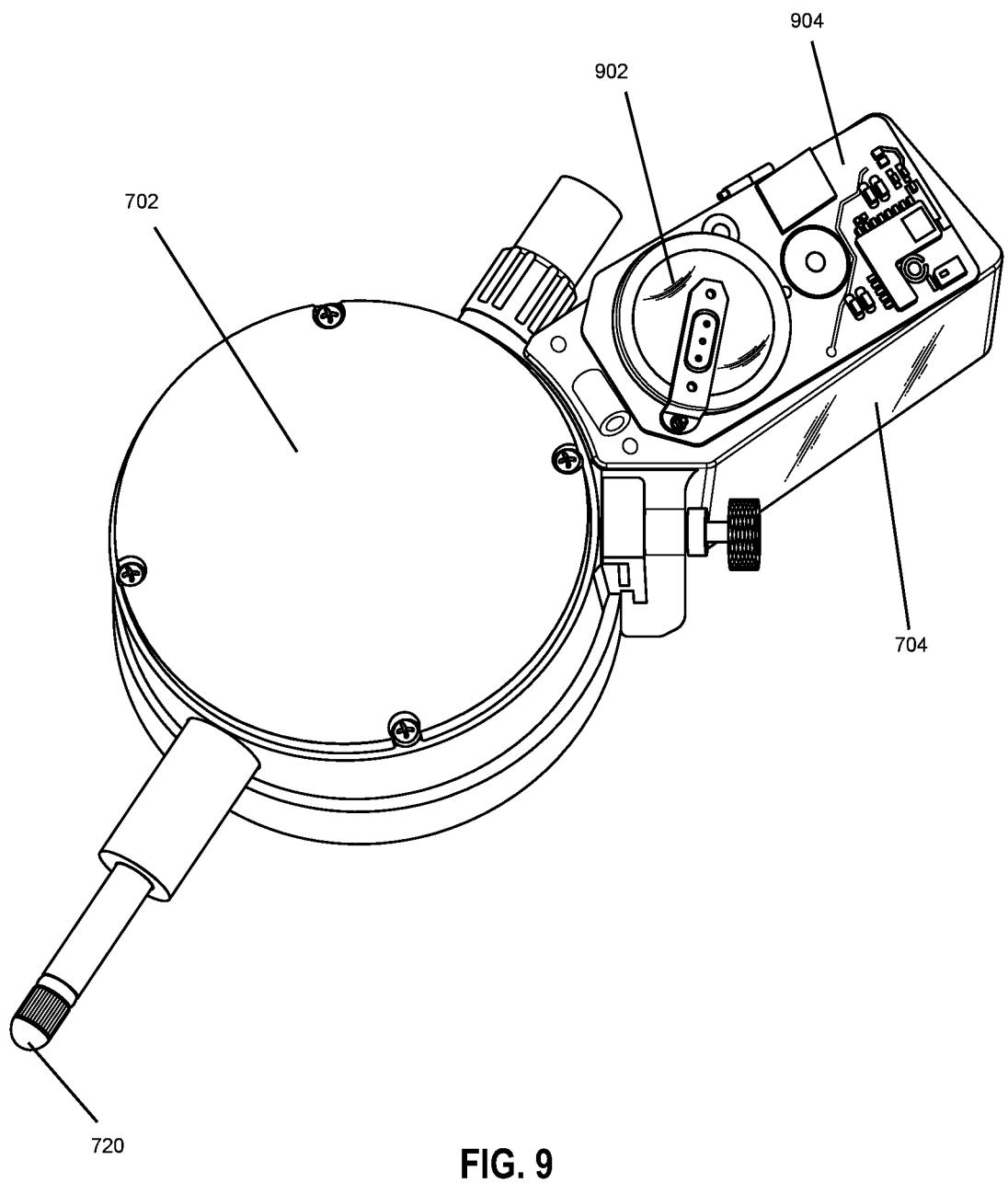

FIG. 9 depicts another view of the dimensional measurement component 700. A prior art digital gage 702, such as available from Mitutoyo and others, is illustrated with a wireless transceiver module 704 attached to communicate data from the exiting data port (not shown). Module 704 is shown to comprise a battery 902 and circuit board 904.

In alternate embodiments, the tool may be equipped with other sensors or indicators that may be utilized to indicate when a measurement is being taken. As an example, some tools are preferentially used in certain orientations, such as when the pipe is horizontal. In that case, an orientation sensor may indicate that a measure is to be taken. As an example, a pitch diameter and taper gage tool will be held vertically to take measures on a horizontal pipe, but the tool is likely stored horizontally.

Also, some tools are preferentially used when one portion is stationarily placed against the pipe and another part is moved. Accelerometers may be used to indicate when a measure is being taken. As an example, a pitch and taper gage may have one point placed and held at a datum while the other end will be swung or swept in an arc around the product.

Also, most tools contact the pipe, which may be conductive to electricity and may also be magnetic. A proximity sensor or magnetic sensor may let the application know when the tool is nearing a pipe end. A contact sensor or conductivity sensor may be used to let the application know that the tool is in contact the product and a measure is being or can be taken.

A preferred embodiment of the tool has no visual measurement displays or outputs on the tool. However, in some cases, it may be preferable to have some type of operator feedback mechanism on the tool. If this is desired, once a measurement cycle has been completed, the application may send a signal to the tool to notify the user. This signal may activate an LED light such that yellow indicates that a measure may be made, green is a successful measurement is cycle recorded, and red is an unsuccessful measure or some fault, or that the timeout period has expired and the tool needs to be recalibrated. Similarly, auditory tones or a synthesized voice from the tool may accomplish this feedback.

In another envisioned embodiment, the application, rather than the tool, may send feedback to the operator, or may use a third device such as a cell phone or other device that the operator has access to. In such a case, when the application records a measure, it may send a signal to the cell phone or ear bud of the operator. This may be a vibration or an audible tone or synthetic voice, which may give further instructions to the operator.

In another alternative embodiment, the application may note how quickly or slowly an operator is taking measures, and may adjust the timer intervals from that data. Faster users may be given less time to take new measures, and slower users will be given more time.

In another alternative embodiment, an operator may speak some predetermined words to an audio input, such as a microphone, on the tool or on the computing device, or associated with an ear bud to initialize it, or to make menu selections in the application. This would leave the hands of the operator free. Similarly, the tool may have a microphone (see, e.g. microphone 802, FIG. 8) such that the operator would be able to provide input to the application by speaking to the tool.

In another envisioned embodiment, the tool may be equipped with its own private signing key that it may use to securely sign all information it sends. Similarly, the application may be configured to only accept signed information from the tool. The application may then further secure the recorded information with its own signing key to provide secured and nonrepudiable records. Others looking at the information will be able to ascertain that the information was signed by the application and by the tool, and the information (such as the set of all records) will be tamper-proof or at least tamper-evident.

Some scenarios can be described to further explain aspects of the inventions disclosed herein. In a first scenario, a machine tool operator may utilize the inventions while manufacturing tapered pipe ends. The objectives of the operator would be to take or make a plurality of measurements of the pipe ends during the lathing process to ensure that the threads are being cut to specification. In the prior art operation, the operator may take the following steps: stop the machine tool; pick up a metrological tool; calibrate or zero the tool with a standard; apply the tool to the taper to be measured at a known point; observe the gage reading; record the best reading; look up the designed measure for the point measured and compare that to the reading taken; replace the tool, or take another reading; make any adjustments and restart the lathing operation.

The same scenario but utilizing the inventions disclosed herein may proceed as follows: the machine tool operator stops the machine tool; the machine tool operator picks up a metrological tool from, for example, its charging station; this movement or decoupling action activates the App, which asks if this is the same piece of pipe or a new piece; the operator responds to that inquiry, such as by speaking to the tool, or inputting feedback to the computing device, and selects a method to calibrate the tool, and places a standard into the tool then removes it. The App determines the calibration, and signals the operator, such as through a yellow LED that the tool is ready and the measurement period is running. The operator then applies the tool to the point to be measured, and may move the tool about the measurement point or to other points be measured. The at the end of the measurement period, the App indicates to the operator such by a green LED a measurement cycle has been successfully completed. The operator places the tool back into the charging station ending the measuring operation; the App presents the operator with the characteristics of the work piece along with a calculated measurement and tolerances; the operator makes corrections to the product, if needed and resumes the machine tool operators. Alternatively, the App may just send parameters for corrections directly to the machine tool.

In a second scenario, a pipe manufacturer may make final quality assurance (QA) measurements for a production run of pipe, and record the characteristics of each piece. The objective of the QA supervisor would be to record measures of each piece of pipe for manufacturing certification and to publish to the purchaser of the pipe. In the prior art operation, the QA supervisor may take the following steps: the supervisor walks through the stacked pipe with paper forms and a tool; the supervisor records the identity of the pipe to be measured on the paper form; zeros the tool with a standard; applies to the tool to the piece to be measured; observes the gage readings; records the best observed reading on the paper form; move to the next piece of pipe; when each piece of pipe has been recorded in this way, the supervisor returns to his or her desk and inputs all of the pipe identities with all of their measured characteristics.

The same scenario with the benefits of the inventions disclosed herein may proceed as follows: the QA supervisor walks through the stacked pipe with a small computing device, such as a tablet or smart phone, loaded with the App on it and a metrological measuring tool; inputs the identity of a specific piece of pipe into the App; alternatively, the computing device may have a bar code or QR reader which may further automate the process; selects a zeroing or calibration method; places a standard into the tool and removes it; applies the tool to the point to be measured, and possibly moves the tool to other points to be measured; as each piece of pipe is measured, the identity of the pipe and its characteristics are transmitted to a cloud-based application which fills out the certifications and may also notify a purchaser.

A similar scenario may involve an operator selecting pipe for use in drilling in an oilfield.

Combining these scenarios may allow post-use heuristics of product. As an example, comparisons may be made between the recorded readings at each point in the life of the pipe (final QA at manufacturing, receiving at stockyard, receiving at field site, etc.). Any differences may indicate a tool is misaligned, a standard has been damaged, the pipe was damaged or warped in transit, and so forth. Long-term reviews of readings and any correlations determined from them may pinpoint specific tools and/or practices that may be improved. This may also include keeping statistics of users who are taking the readings. An analysis of these statistics may provide best practices or further optimizations.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A method of measuring, comprising:
   providing a metrological instrument configured to be held by at least one hand and to transduce one or more dimensional characteristics into one or more electrical signals representative of the one or more dimensional characteristics, and configured to communicate information representative of the one or more dimensional characteristics to a remote computing device;
   providing the remote computing device and configured to receive from the metrological instrument the information representative of the one or more dimensional characteristics;
   establishing a first period for measuring a dimensional characteristic;
   engaging the metrological instrument with a product to be measured using the at least one hand;
   automatically acquiring without human intervention or activation a plurality of signals representative of a dimensional characteristic of the product during the first period;
   automatically communicating to the remote computing device without human intervention or activation on the metrological instrument information representative of the dimensional characteristic acquired by the metrological instrument during the first period; and
   the remote computing device determining at least one dimensional characteristic of the product from the information representative of the characteristic for the first period.

2. The method of claim 1, wherein the instrument and computing device are configured to communicate wirelessly.

3. The method of claim 2, wherein the computing device comprises a smart phone, a tablet computer, or a laptop computer.

4. The method of claim 2, wherein the dimensional characteristic is determined by a statistical analysis of the information representative of the characteristic.

5. The method of claim 4, wherein the information representative of the characteristic comprises the plurality of signals representative of the dimensional characteristic of the product during the first measurement period.

6. The method of claim 2, wherein the instrument is configured to indicate that the first period is elapsing, that the period has expired, or a combination of both.

7. The method of claim 6, comprising indicating that the first period is elapsing.

8. The method of claim 6, comprising indicating that the first period has expired.

9. The method of claim 2, further comprising indicating that a valid dimensional characteristic could not be determined from the information representative of the characteristic.

10. A method of reducing human error in measurements, comprising:
    providing a hand-held measuring device configured to automatically transduce a measurement into a plurality of electrical signals during a predetermined period;
    automatically acquiring without human intervention or activation a plurality of signals representative of a dimensional characteristic of the product during the predetermined period;
    providing a computing device remote from the measuring device;
    communicating automatically without human intervention or activation the plurality of electrical signals generated during the predetermined period to the computing device; and
    determining in the computing device before manufacture of the product is completed a value representative of the measurement based on the plurality of electrical signals.

11. The method of claim 10, wherein the device and computing device are configured to communicate wirelessly.

12. The method of claim 10, wherein the computing device comprises a smart phone, a tablet computer, or a laptop computer.

13. The method of claim 10, wherein the value is determined by a statistical analysis of the plurality of electrical signals.

14. The method of claim 13, comprising indicating that the predetermined period is elapsing.

15. The method of claim 13, comprising indicating that the predetermined period has expired.

16. The method of claim 10, wherein the device is configured to indicate that the predetermined period is elapsing, that the period has expired, or a combination of both.

17. The method of claim 10, further comprising indicating that a value could not be determined from the plurality of electrical signals.

18. The method of claim 10, wherein the predetermined period is based on a type of measurement to be made.

19. The method of claim 18, wherein the particular type of measurement is selected from: inside diameter, outside diameter, thread profile, minor diameter, pitch diameter, major diameter, pitch, flank angle, thread length, crest diameter, ovality, thread height, stand-off, thread addendum and run-out.

20. The method of claim 10, further comprising providing a software application on the computing device configured with a sequence of predetermined windows for a particular type of measurement.

21. A method of measuring a product characteristic, comprising:
provinding a metrological instrument configured to transduce one or more dimensional characteristics into one or more electrical signals representative of the one or more dimensional characteristics, and configured to wirelessly communicate information representative of the one or more dimensional characteristics;
providing a computing device remote from the metrological instrument and configured to wirelessly receive the information representative of the one or more dimensional characteristics and configured to determine the one or more dimensional characteristics;
establishing a first measurement period;
engaging the metrological instrument with a product to be measured;
automatically acquiring without human intervention or activation a plurality of signals representative of the at least one dimensional characteristic of the product during the first measurement period;
automatically wirelessly communicating without human intervention or activation information representative of the at least one dimensional characteristic acquired during the first period to the computing device; and
determining the at least one dimensional characteristic of the product from the plurality of signals representative of the at least one dimensional characteristic of the product during the first period by a statistical analysis of the information representative of the at least one dimensional characteristic.

22. A method of measuring, comprising:
providing a metrological instrument configured to be held by at least one hand and to transduce one or more dimensional characteristics into one or more electrical signals representative of the one or more characteristics, and configured to wirelessly communicate information representative of the one or more characteristics;
providing a computing device remote from the metrological instrument and configured to wirelessly receive from the metrological instrument the information representative of the one or more dimensional characteristics;
establishing a first period;
indicating on the instrument that the first period is elapsing, that the first period has expired, or a combination of both;
engaging the instrument with a product to be measured using the at least one hand;
automatically acquiring without human intervention or activation a plurality of signals representative of a dimensional characteristic of the product during the first period;
automatically communicating without human intervention or activation information representative of the characteristic during the first period to the computing device; and
determining at least one dimensional characteristic of the product from the information representative of the characteristic for the first period.

* * * * *